United States Patent [19]

Prochazka et al.

[11] 4,427,785
[45] Jan. 24, 1984

[54] OPTICALLY TRANSLUCENT CERAMIC

[75] Inventors: Svante Prochazka, Ballston Lake; Frederic J. Klug, Amsterdam, both of N.Y.

[73] Assignee: General Electric Company, Schenectady, N.Y.

[21] Appl. No.: 381,822

[22] Filed: May 25, 1982

[51] Int. Cl.[3] .......................................... C04B 35/18
[52] U.S. Cl. ................................ 501/128; 264/1.2; 264/65; 264/325; 264/332; 423/327; 501/12; 501/153; 501/154; 501/900
[58] Field of Search ............. 501/12, 128, 153, 154, 501/900; 423/328, 329, 327; 264/1.2, 65, 325, 332

[56] References Cited

U.S. PATENT DOCUMENTS

| | | | |
|---|---|---|---|
| 3,922,333 | 11/1975 | Mazdiyasni et al. | 423/327 |
| 3,989,783 | 11/1976 | McGee et al. | 264/56 |
| 4,101,615 | 7/1978 | Horikiri et al. | 264/65 |
| 4,266,978 | 5/1981 | Prochazka | 264/1.1 |
| 4,381,931 | 5/1983 | Hunold et al. | 264/65 |

OTHER PUBLICATIONS

B. E. Yoldas, "Microstructure of Monolithic Materials Formed by Heat Treatment of Chemically Polymerized Precursors in the $Al_2O_3$–$SiO_2$ Binary", vol. 59, No. 4, pp. 479–483 (1980).
"Advanced Optical Ceramics, Phase II", Book 1 of 2, ONR Contract No. N00014-78-C-0466 (DIN: 80SDR2172) General Electric Co., pp. 1–14 and 21–42 (Aug. 31, 1980).
"Program Review–Advanced Optical Ceramics–Phase II, Government/Industry Briefing" ONR Contract No. N00014-78-C-0466, DARPA Order No. 3387 General Electric Company, P. C-9, (May 8–9, 1980).
K. S. Mazdiyasni & L. M. Brown, "Synthesis and Mechanical Properties of Stoichiometric Aluminum Silicate (Mullite)", vol. 55, No. 11, pp. 548–552, (Nov. 1972).
Levin, E. M. et al., Phase Diagrams for Ceramists–1975 Suppl. Ed. & Pub. by The American Ceramic Soc., Inc. (1975)–FIGS. 4373–74.

Primary Examiner—Helen M. McCarthy
Attorney, Agent, or Firm—Jane M. Binkowski; James C. Davis, Jr.; James Magee, Jr.

[57] ABSTRACT

Optically translucent theoretically dense body of mullite is produced by pressing an amorphous mixed oxide powder composition of from about 72.5 weight % to about 76.5 weight % $Al_2O_3$/balance $SiO_2$ into a compact of density of at least 1.0 g/cc, sintering the compact in oxygen or a vacuum of 0.05 torr to 1 torr producing a gas-impermeable compact, hot isostatically pressing the gas-impermeable compact to theoretical density, and with respect to compositions ranging from higher than about 74 wt % $Al_2O_3$/balance $SiO_2$, annealing the theoretically dense body.

19 Claims, 3 Drawing Figures

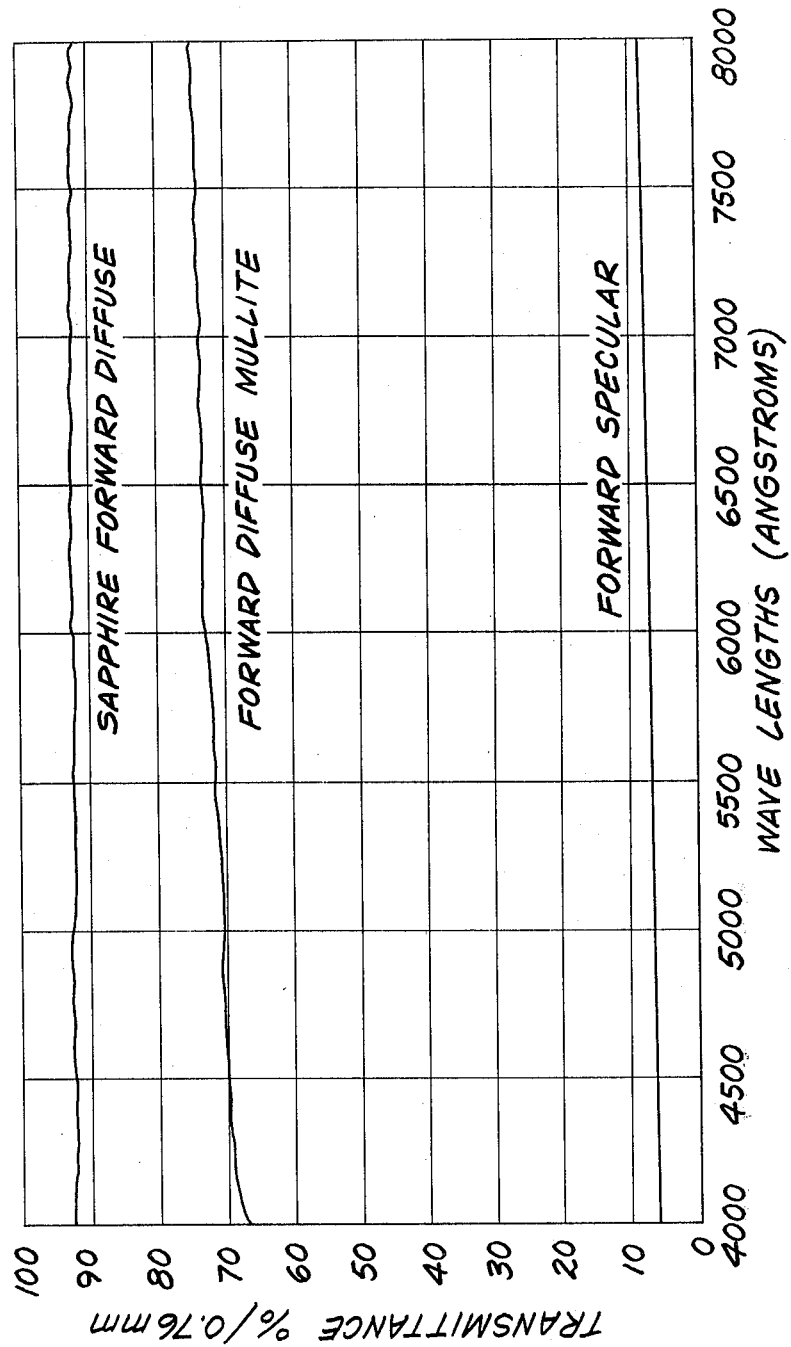

OPTICALLY TRANSLUCENT CERAMIC

The Government has rights in this invention pursuant to Contract N00014-80-C-0964 awarded by the Department of the Navy.

This invention relates to compacted amorphous aluminum silicate compositions that transform to mullite in an advanced stage of densification and, depending upon its composition, the mullite continues to densify thereafter into an optically translucent theoretically dense ceramic, or the theoretically dense mullite is annealed into an optically translucent ceramic.

Mullite, a crystalline aluminum silicate phase of composition $3Al_2O_3.2SiO_2$ or close to $3Al_2O_3.2SiO_2$, is a common mineral constituting silicate ceramics (whiteware, fire clay, etc.). Recent phase diagrams report 71.5 to 74 weight % $Al_2O_3$ as the compositional band for mullite crystallized in the solid state.

Mullite has been studied extensively, however its pore free, translucent polycrystalline forms were reported only by Mazdiyasni and Brown (1972) and Yoldas (1978). Specifically, Mazdyiasni and Brown, "Synthesis and Mechanical Properties of Stoichiometric Aluminum Silicate (Mullite)", Journal of the American Ceramic Society, Vol. 55, No. 11, pages 548–552 (Nov. 1972) disclose alkoxy-derived submicron aluminum silicate ($3Al_2O_3.2SiO_2$), specifically 71.8 wt % $Al_2O_3$/28.2 wt % $SiO_2$, with acicular, needlelike morphology can be vacuum-hot-pressed into highly dense, translucent polycrystalline bodies of stoichiometric mullite, and that the resulting compacts had a fine-grained microstructure consisting of needlelike interlocking grains arranged in an overall "jigsaw" pattern.

Yoldas, "Microstructure of Monolithic Materials Formed by Heat Treatment of Chemically Polymerized Precursors in the $Al_2O_3$-$SiO_2$ Binary", Ceramic Bulletin, Vol. 59, No. 4, pages 479–483 (1980) discloses that transparent gel materials were prepared in the $Al_2O_3$-$SiO_2$ binary at low temperatures by a technique that allows polymerization of aluminum and silicon through oxygen bridges at room temperature, specifically by reacting an aluminum hydrosol with silicon tetraethoxide, and that when these gel materials were heated, he observed that the composition 63 wt% $Al_2O_3$-37% $SiO_2$ had a unique capacity to remain transparent at high temperatures, i.e. 1400° C., where other materials turned opaque.

In pure form mullite would be interesting as an optical material for its low thermal expansion, high melting point, chemical stability and absence of absorption bands in the visible spectrum.

According to the present invention, an optically translucent theoretically dense body of mullite is produced by pressing an amorphous mixed oxide powder composition of from about 72.5 weight % to about 76.5 weight % $Al_2O_3$/balance $SiO_2$ into a compact of at least 1.0 g/cc, sintering the compact in oxygen or a vacuum of 0.05 torr to 1 torr producing a gas-impermeable compact, hot isostatically pressing the gas-impermeable compact to theoretical density, and with respect to compositions ranging from higher than 74 wt % $Al_2O_3$/balance $SiO_2$, annealing the theoretically dense body.

Briefly stated, in one embodiment of this invention, the present optically translucent mullite product is produced by a process comprising providing an amorphous shapeless mixed oxide powder comprised of from about 72.5 weight % to about 76.5 weight % $Al_2O_3$ balance $SiO_2$ which contains no significant amount of contaminants, said powder being pressable at about room temperature into a compact having a minimum density of 1.0 g/cc, pressing said powder into a compact having a minimum density of 1.0 g/cc, sintering the compact at a temperature which has no significant deleterious effect on it in oxygen or in a vacuum ranging from about 0.05 torr to about 1 torr producing a gas-impermeable compact, hot isostatically pressing the gas-impermeable compact with a gas which has no significant deleterious effect on it at superatmospheric pressure of at least about 5000 psi at a temperature ranging from about 1500° C. to about 1700° C. producing a body of theoretical density based on the density of 3.16 g/cc±0.01 or 3.17 g/cc±0.01 for said mullite body, said isostatic pressing gas being selected from the group consisting of argon, helium, nitrogen and mixtures thereof, and with respect to compositions of higher than about 74 weight % $Al_2O_3$/balance $SiO_2$, annealing the theoretically dense body in a gas selected from the group consisting of oxygen, air, argon, helium, nitrogen and mixtures thereof at a temperature ranging from about 1700° C. to about 1850° C., said annealing temperature having no significant deleterious effect thereon.

Briefly stated, in another embodiment of this invention, the present optically translucent mullite product is produced by a process which comprises providing an amorphous shapeless mixed oxide powder comprised of from about 72.5 weight % to about 76.5 weight % $Al_2O_3$/balance $SiO_2$, calcining the powder in air at a temperature ranging from about 490° C. to about 1100° C. to remove water and organic material therefrom leaving no significant amount thereof producing a shapeless amorphous powder which contains no significant amount of contaminants, said calcined powder being pressable at about room temperature into a compact having a minimum density of 1.0 g/cc, pressing said calcined powder into a compact having a minimum density of 1.0 g/cc, sintering the compact at a temperature which has no significant deleterious effect on it in oxygen or in a vacuum ranging from about 0.05 torr to about 1 torr producing a gas-impermeable compact, hot isostatically pressing the gas-impermeable compact with a gas which has no significant deleterious effect on it at superatmospheric pressure of at least about 5000 psi at a temperature ranging from about 1500° C. to about 1700° C. producing a body of theoretical density based on the density of 3.16 g/cc±0.01 or 3.17 g/cc±0.01 for said mullite body, said isostatic pressing gas being selected from the group consisting of argon, helium, nitrogen and mixtures thereof, and with respect to compositions of higher than about 74 weight % $Al_2O_3$/balance $SiO_2$, annealing said theoretically dense body in a gas selected from the group consisting of oxygen, air, argon, helium, nitrogen and mixtures thereof at a temperature ranging from about 1700° C. to about 1850° C., said annealing temperature having no significant deleterious effect thereon.

By a shapeless powder it is meant herein a powder with no regular or distinguishing shape or form on a microscopic scale. By a fluffy powder it is meant herein a powder which is like fluff, i.e. it is loose and soft. The present powder is characterized by a low bulk density which ranges from about 0.2 g/cc to about 0.3 g/cc at about room temperature.

By room temperature it is meant herein 25° C.

The product of the present invention is an optically translucent polycrystalline body of mullite composed of from about 72.5 weight % to about 76.5 weight % of $Al_2O_3$/balance $SiO_2$. Its microstructure depends on its composition and processing temperature.

By an optically translucent polycrystalline product or body it is meant herein a body through which light or radiation in the visible wave length is able to pass through sufficiently to make such body useful for optical applications such as enclosures for arc tubes.

Those skilled in the art will gain a further and better understanding of the present invention from the detailed description set forth below, considered in conjunction with the figures accompanying and forming a part of the specification, in which:

FIG. 3 shows graphs illustrating the optical transparency of the present product in the visible wave length range from blue to red.

Figure 1:
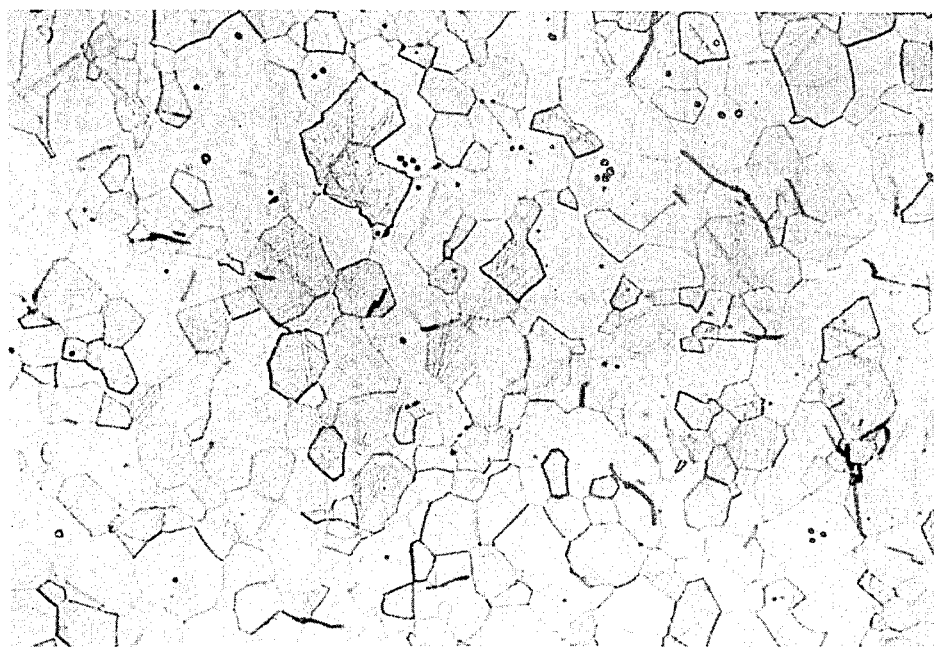
FIG. 1 is a photomicrograph (magnified 750×) showing the polished and etched section of a sintered optically translucent disc 75 weight % $Al_2O_3$/25 weight % $SiO_2$ produced in accordance with the present invention.

The present starting mixed oxide powder is prepared from a homogeneous gel composed of hydrolyzed precursors of $Al_2O_3$ and $SiO_2$. The precursors can be organic or inorganic and are used in amounts which produce the present mixed oxide composition, i.e. the present aluminosilicate composition. This gel is produced, i.e. precipitated, in a known manner through hydrolysis of a solution of organic or inorganic precursors for $Al_2O_3$ and $SiO_2$. Depending largely on the starting materials, a peptizing agent such as nitric acid may be added to the solution to promote conversion to a gel.

For example the gel can be prepared by hydrolysis of alkyloxides of silicon and aluminum. For example, the gel can be produced by dissolving aluminum isopropoxide and ethylmetasilicate in cyclohexane, and hydrolysis of the solution carried out by an addition of the theoretical amount of water (required to completely hydrolyze the alkyloxides) preferably dissolved in tertiary butyl alcohol to prevent separation of water into another phase during hydrolization. The water should be thoroughly admixed with the solution, preferably at about room temperature, to obtain substantially complete hydrolysis.

In a preferred technique, aluminum monohydrate is dispersed in water with a pH adjusted by nitric acid or other acid to a pH of about 4 by intensive agitation to obtain a colloidal dispersion. It is preferred but not essential that the colloidal dispersion be separated from the non-dispersible residue by screening through fine sieves or by centrifugation. The resulting colloidal dispersion of monohydrate is analyzed for its total $Al_2O_3$ content, and then mixed, for example, with ethylsilicate, in a ratio which produces the present ratio of 72.5 weight % to 76.5 weight % $Al_2O_3$ balance $SiO_2$. The mixture should be stirred, preferably at about room temperature, to complete hydrolysis producing the present gel product.

The present gel can be organic or inorganic and it always contains water. Preferably, if possible, the gel is thickened by filtration before it is dried to produce the present amorphous fluffy powder.

The present gel must be dried in a manner which produces the present starting amorphous fluffy powder. Specifically, drying of the gel must be carried out to remove water therefrom without collapsing it into dense particles. The present gel cannot be dried by removing its water content in liquid form since such removal collapses the gel into dense particles. Therefore, simple evaporation at room temperature or elevated temperatures cannot be applied as it results in shrinkage and formation of a strong particulate substance.

The gel can be freeze dried to produce the present starting powder. Generally, this comprises freezing the gel and subliming off its water content under vacuum. Freeze drying is not applicable to gels containing alcohols with low freezing points as these alcohols suppress the freezing point.

Alternatively, the gel can be dried by replacing its water content with a non-aqueous solvent producing a non-aqueous gel which can be dried in several ways to produce the present starting powder. Specifically, this is an exchange of solvents procedure and is applicable if the gel can be filtered. The filtered gel is then diluted with methanol, filtered, and the resulting gel further washed with methanol to displace all water and finally methanol is washed away with acetone. The resulting non-aqueous gel can be dried in air at room temperature to produce the present starting powder.

Alternatively the gel can be dried by removal of the water under supercritical conditions to produce the present powder. This can be carried out by transferring the gel into an autoclave and heating it above the critical point of water, which is above 374° C. at a pressure of 3184 psi. At this temperature the water disappears and vapor is slowly vented from the autoclave. The product is the present powder or a very friable lumpy material which is easily broken down to the present powder.

The starting aluminum silicate powder is an amorphous powder of finely dispersed oxides composed of from about 72.5 weight % to about 76.5 weight % $Al_2O_3$ balance $SiO_2$. Depending largely on its specific method of preparation, it contains a significant amount of water and usually, a significant amount of organic material. This powder is white, fluffy, free-flowing and shapeless with a surface area, according to low temperature nitrogen adsorption techniques, ranging from about 100 square meters per gram to about 400 square meters per gram, and preferably from about 200 square meters per gram to about 300 square meters per gram. This powder also has a low bulk density which ranges from about 0.2 g/cc to about 0.3 g/cc at about room temperature. No water should be added to this powder since the addition of water to it would shrink and collapse it into dense particles on subsequent drying.

The starting powder is calcined in air at atmospheric pressure at a temperature ranging from about 490° C. to about 1100° C., preferably from about 500° C. to 700° C., to remove water and organic material therefrom leaving no significant amount thereof. A calcining temperature below 490° C. may not remove its organic content. A calcining temperature above about 900° C. tends to aggregate the powder lightly but such calcined powder can be dry milled to break down the aggregates and dry screened without affecting its morphology significantly. Temperatures above about 1100° C. are not useful since they cause significant formation of hard aggregates. Calcining time is determinable empirically, for example, by weight loss. Calcining is completed when there is no more weight loss on further firing. Because heat transmission in this powder is very low, firing time can be as long as 10 hours. This calcining has no significant deleterious effect on the powder or its $Al_2O_3/SiO_2$ composition. Specifically, this firing does not affect the oxide composition or morphology of the powder in any significant manner.

The calcined powder is amorphous, shapeless, fluffy and free-flowing and contains no significant amount of contaminants. It is a finely dispersed mixed oxide composed of from about 72.5 weight % to about 76.5 weight % $Al_2O_3$ balance $SiO_2$. It has a surface area according to low temperature nitrogen adsorption techniques, ranging from about 100 square meters per gram to about 400 square meters per gram, and preferably from about 200 square meters per gram to about 300 square meters per gram. The calcined powder also has a low bulk density which ranges from about 0.2 g/cc to about 0.3 g/cc at about room temperature. This calcined powder must be pressable at or about room temperature, i.e. about 25° C., into a compact with a minimum density of 1.0 gram/cc. No water should be added to the calcined powder since the addition of water to it would shrink and collapse it into dense particles on subsequent drying. In the present invention, a mixed oxide powder outside the present composition does not produce the present optically translucent body.

The calcined powder is pressed to produce a compact, i.e. a green compact, having a density of at least 1.0 gram/cc, and preferably higher than about 1.0 gram/cc to as high as possible, which usually is about 1.6 gram/cc at about room or ambient temperature. A compact with a density lower than 1.0 gram/cc will not produce the present optically translucent product. A minimum applied pressure of about 10,000 psi may produce the present pressed compact, but typically the applied pressure is at least about 30,000 psi. The applied pressure can range to as high as possible which usually is about 100,000 psi. No additives or additions should be made to the powder. The powder preferably is pressed at about room or ambient temperature. There is no advantage in using a temperature other than about room temperature.

The calcined powder is pressed into a compact by means which have no significant deleterious effect thereon. Specifically, the pressing means should not contaminate the powder. The powder can be die-pressed or isostatically pressed. Preferably, a steel die is used in die-pressing.

The compact can vary widely in form and size. It can be of simple, hollow or of geometrically complex shape. The present pressed compact having a density of at least 1.0 gram/cc has sufficient strength for handling purposes. For example, the present pressed compact in the form of a hollow tube having a wall thickness of 20 mils was sufficiently strong for handling purposes.

If desired, the compact may be prefired to impart additional strength to it allowing it to be more easily machined. Generally, prefiring temperature to add strength to the compact ranges up to about 1650° C. The particular prefiring temperature and prefiring time are determinable empirically and should have no significant deleterious effect on the compact. If such prefiring is carried out at a temperature at which the pores of the compact remain open, and ordinarily closure of the pores in the compact is initiated at about 1500° C., then this prefiring to add strength to the compact can be carried out at atmospheric pressure in air, argon, helium, nitrogen, oxygen and mixtures thereof, as well as a partial vacuum provided such partial vacuum does not significantly vaporize the $SiO_2$ component of the compact. However, at a prefiring temperature at which pore closure in the compact occurs, i.e. at temperatures ranging from about 1500° C. to about 1675° C., such prefiring must be carried out in oxygen or in a partial vacuum ranging from about 0.05 torr to about 1 torr.

In the present process, the green pressed compact or the prefired compact is then sintered at a temperature ranging from about 1500° C. to about 1675° C. and preferably about 1600° C. to about 1650° C. To produce a compact impermeable to gas, i.e. a closed pore compact impermeable to gas. Sintering must be carried out in oxygen which is preferably at atmospheric pressure or in a vacuum ranging from about 0.05 torr to about 1.0 torr. The particular sintering temperature and sintering time are determinable empirically and should have no significant deleterious effect on the compact. Since at the sintering temperature of about 1500° C. and higher, pores of the compact are being disconnected from its surface, the furnace atmosphere has to be pure oxygen or a vacuum ranging from about 0.05 torr to about 1.0 torr. Other gases, such as nitrogen, argon or carbon dioxide, when present in the sintering atmosphere during pore closure in the compact, would be entrapped in the pores and would inhibit pore removal during sintering. Only oxygen is transported through crystalline mullite at a high enough rate not to interfere with the present sintering process, and therefore, only an oxygen furnace atmosphere can be applied when firing through the interval of pore closure. Similarly, a vacuum lower than about 1.0 torr, i.e. where the pressure of the atmosphere is greater than about 1.0 torr, if gases other than oxygen are present, may introduce significant amounts of these gases into the pores and adversely limit the translucency of the product. However, a vacuum higher than about 0.05 torr may vaporize the $SiO_2$ component of the compact.

The rate of heating to firing or sintering temperature depends to a large extent on the extent of any impurities in the compact. The rate of heating should be such as to eliminate any impurities from the compact before it reaches a temperature which locks these impurities in. Generally, the compact is heated to firing or sintering temperature at rates which range up to about 300° C. per hour. Higher heating rates may produce bloating of the body due to volatiles which did not escape earlier.

The sintered compact need only be impermeable to gas. Such impermeability can be determined by a number of techniques. For example, it can be determined by suspending the sintered compact and immersing it in water or other liquid and determining whether the thus-suspended-immersed compact shows any observable weight gain. Preferably, this is carried out by weighing the sintered compact dry, submerging the compact in boiling water, letting the water cool to room temperature, recovering the compact from the water, and re-weighing it to determine any weight gain. If no weight gain is observed, then the compact will have attained closed porosity, and thereby is gas impermeable.

The gas-impermeable compact is hot isostatically pressed with a gas which has no significant deleterious effect on it at superatmospheric pressure and at elevated temperature to produce a body of theoretical density based on the density of 3.16 grams/cc±0.01 or 3.17 grams/cc±0.01 for said mullite body. The isostatic pressing gas is selected from the group consisting of argon, helium, nitrogen, and mixtures thereof, and preferably, it is argon. During hot isostatic pressing, the compact should be totally confined to prevent significant loss of $SiO_2$ from its surface. Such confinement, for example, can comprise immersion of the compact in mullite powder, or confining it in an alumina crucible with lid. The isostatic pressing gas should be at a pressure of at least about 5000 psi, preferably about 30,000 psi, and the hot isostatic pressing should be carried out at a temperature ranging from about 1500° C. to about 1700° C., preferably about 1600° C. to about 1700° C. Gas pressures lower than about 5000 psi and temperatures lower than about 1500° C. are not operable to densify the gas-impermeable compact to theoretical density. As a practical matter 30,000 psi is the maximum obtainable. Higher gas pressure may be used up to but not including a pressure that would bring about transformation to high pressure phases at the applied temperature. This pressure is not exactly known and is larger than 100,000 psi at 1650° C. Hot isostatic pressing temperatures higher than about 1700° C. may coarsen the grains and prevent densification of the compact.

The rate of heating to the isostatic pressing temperature is not critical, and high heating rates can be applied. For example, these heating rates can be as high as 1000° C. per hour, if desired. Generally, these heating rates range up to about 300° C. per hour and are limited by the furnace. Upon completion of the present hot isostatic pressing, the rate at which the resulting theoretically dense body is cooled is not critical and generally it is furnace-cooled to room temperature. Also, the rate at which the gas pressure is reduced to atmospheric pressure is not critical, and cooling need not be carried out simultaneously with reduction in gas pressure.

The time period to carry out the present hot isostatic pressing depends largely on the temperature and pressure used and is determinable empirically with increasing temperature requiring less time. Typically, a temperature of about 1600° C. and a pressure of about 30,000 psi will require a time period of about 1 hour.

Hot isostatic pressing of the gas impermeable compact produces a theoretically dense body which also may be optically translucent. Specifically, when the gas impermeable compact is comprised of from about 72.5 weight % to about 74 weight % $Al_2O_3$/balance $SiO_2$, the resulting theoretically dense body is optically translucent. On the other hand, when the gas impermeable compact is comprised of from higher than 74 weight % $Al_2O_3$/balance $SiO_2$, the resulting theoretically dense body is likely to require annealing to make it optically translucent. Also, if desired, the hot isostatically pressed theoretically dense body which is optically translucent may be annealed according to the present invention to increase its optical translucency in some instances.

When required, the resulting isostatically pressed theoretically dense body is annealed to make it optically translucent, or if possible, to increase its optical translucency. Annealing is carried out in an atmosphere selected from the group consisting of oxygen, air, argon, helium, nitrogen and mixtures thereof. However, when the annealing atmosphere is helium, argon, nitrogen or mixtures, the body should be totally confined to prevent significant loss of $SiO_2$ from its surface. Such confinement, for example, can comprise immersion of the body in mullite powder, or confining it in an alumina crucible with lid. The annealing atmosphere is at atmospheric or about atmospheric pressure. The annealing atmosphere is a stagnant or flowing atmosphere.

Annealing temperature ranges from about 1700° C. to about 1850° C. with the particular annealing temperature depending largely on the $Al_2O_3$ content of the theoretically dense body and should not have a significantly deleterious effect thereon, i.e. it should not form glass phase in a volume of 1% or higher of the total volume of the body. For example, for a theoretically dense body containing 72.5 weight % $Al_2O_3$, temperatures significantly higher than about 1700° C. are likely to form 1% or higher volume fraction of glass phase producing a body of insufficient translucency for use as an envelope for an arc tube. Formation of glass phase decreases with increasing $Al_2O_3$ content. For a body containing 74 weight % $Al_2O_3$, temperatures significantly higher than about 1800° C. may form 1% or higher volume fraction of glass phase, but temperatures up to about 1850° C. have no significant deleterious effect on bodies containing from about 74.5 weight % to about 76.5 weight % $Al_2O_3$. Annealing temperatures lower than about 1700° C. do not produce the present optically translucent body. On the other hand, temperatures higher than 1850° C. produce an annealed body with grains that are too large thereby rendering it with poor strength. Also, temperatures above 1850° C. bring about reduction of transmission as a result of the formation of a glass phase. Moreover such temperatures are close to the melting point of mullite.

The rate of heating to the annealing temperature is not critical, and high heating rates can be applied. For example, these heating rates can be as high as 1000° C. per hour, if desired. Generally, these heating rates range up to about 300° C. per hour and are limited by the furnace. Upon completion of the present annealing, the rate at which the resulting optically translucent body is cooled is not critical.

The particular annealing time period depends largely on the annealing temperature and is determinable empirically with increasing annealing temperature requiring less annealing time. For example, an annealing temperature of about 1800° C. typically has an annealing time period of about 1 hour.

In one embodiment of the present invention, the hot isostatically pressed theoretically dense body is not cooled but pressure is reduced to atmospheric pressure and the body is annealed in the same furnace in oxygen, air, argon, helium, nitrogen and mixtures thereof at a temperature ranging from about 1700° C. to about 1850° C.

In the present process, there is no significant loss of $Al_2O_3$ or $SiO_2$.

The present optically translucent body is comprised of an aluminosilicate composed of from about 72.5% by weight to about 76.5% by weight $Al_2O_3$/balance $SiO_2$. Its composition is determinable by a number of techniques including wet chemical analysis, X-ray fluorescent analysis, mass spectroscopy and electron beam microanalyses.

The microstructure of the present optically translucent polycrystalline body may vary somewhat depending on its composition and on the temperatures used in its production. In the temperature range of about 1700° C. to about 1850° C. and a composition composed of about 74.5 weight % to about 76.5 weight % $Al_2O_3$/balance $SiO_2$, the resulting optically translucent body has or is likely to have a uniform or substantially uniform microstructure comprised of equiaxed or substantially equiaxed grains with an average grain size ranging from about 2 microns to about 50 microns. An average grain size less than about 2 microns usually renders the body with poor optical properties. On the other hand, an average grain size higher than about 50 microns renders the optically translucent body with poor strength largely due to microcracking. Preferably, for best optical translucency and strength, the present optically translucent body has an average grain size ranging from about 5 microns to about 35 microns. The grain size of the optically translucent product depends largely on hot isostatic and annealing temperatures and times at temperature. The higher the temperature and the longer the time at temperature, the larger is the average grain size of the product.

However, the microstructure of the present optically translucent body varies when it is composed of about 72.5 weight % up to about 74.5 weight % $Al_2O_3$/balance $SiO_2$ and produced at or subjected to a temperature below about 1800° C. Specifically, with a content of about 72.5 weight % to about 74 weight % $Al_2O_3$, the optically translucent body produced at or subjected to below about 1800° C. will have, or may have a microstructure composed of elongated grains. As the $Al_2O_3$ content is increased within this compositional interval close to 74%, microstructures composed of grains of both equiaxed and elongated morphology will form. With a further increase in $Al_2O_3$ content, i.e. approaching 74.5 weight %, the resulting optically translucent body likely will have a microstructure which is uniform or substantially uniform composed of equiaxed or substantially equiaxed grains.

The present optically translucent body ranges from one comprised of single phase to one comprised of a primary phase and secondary phase, said secondary phase ranging up to about but less than 1% by volume of the total volume of the optically translucent body. Such phase composition of the optically translucent body is determinable by optical microscopy. By the term single phase or primary phase it is meant herein the mullite phase. The mullite phase also is identifiable by X-ray diffraction analyses. The secondary phase should have no significant deleterious effect on the present product. The secondary phase may be $Al_2O_3$ or glass.

Ordinarily, when the $Al_2O_3$ component of the optically translucent body ranges from about 74.5 weight % to about 75.5 weight %, or approaches such range and it has been annealed at from about 1800° C. to about 1850° C., the optically translucent body is composed of a single phase of mullite. However, as the $Al_2O_3$ content of the optically translucent body approaches 76 weight %, the optically translucent body is likely to show a minor amount of $Al_2O_3$ precipitate as a secondary phase. The presence of the $Al_2O_3$ phase is detectable by optical microscopy, X-ray diffraction analysis and by scanning electron microscopy. On the other hand, as the $Al_2O_3$ content approaches 74 weight % or lower, the optically translucent body is likely to show glass as a secondary phase. The glass phase is determinable by optical microscopy after the specimen has been metallographically prepared which includes acid-etching, and by scanning electron microscopy.

The present polycrystalline optically translucent body is of theoretical density, i.e. it has a density of 3.16 g/cc±0.01 or 3.17 g/cc±0.01, or a 100% density based on the density of 3.16 g/cc±0.01 or 3.17 g/cc±0.01 for mullite. The specific density value can vary because it depends on the specific composition of the present mullite product. Such an optically translucent body may have residual small pores but the porosity is not detectable by current liquid displacement density measurements, i.e. it is less than 0.05% by volume of the total volume of the sintered body.

The degree of transmission of radiation through the present optically translucent product can also be defined by transmittance, and specifically forward diffuse transmittance, which is the ratio of the intensity of the transmitted beam and the intensity of the incident beam and refers to radiation of certain wave length and a specimen of certain thickness. These variables are related by the formula below, $$I/I_o = ke^{-\alpha d}$$

where $I$ and $I_o$ are the intensities of the transmitted and incident beams, d the thickness of the specimen, $\alpha$ the absorption coefficient and k is a constant determinable from the refractive index of the material. In addition the cone angle of the transmitted beam has to be specified.

The present optically translucent body has an average minimum forward diffuse transmittance of 70% at 0.75 millimeter thickness over the visible wave lengths ranging from 4000 Angstroms to 8000 Angstroms.

The invention is further illustrated by the following examples wherein the procedure was as follows unless otherwise stated:

Surface area measurements were made by a low temperature nitrogen absorption technique.

Calcining was carried out in air at atmospheric pressure.

Firing and sintering was carried out in a molybdenum-wound resistance furnace comprised of a dense open-ended alumina tube with a ¾ inch I.D. or a 2 inch I.D.

Hot isostatic pressing was carried out in an autoclave with an internal Mo resistance furnace.

Temperature was measured and controlled with a W 5% Re, W 26% Re thermocouple contained in a protective sapphire sheath. Temperature measurement also was performed by sighting directly on the sample with an optical pyrometer.

At the end of each run, the power was switched off and the body was furnace-cooled to room temperature.

The bulk density of the powder as well as each pressing or compact was determined from its weight and dimensions.

Density of the optically translucent product was determined by water displacement using Archimedes method.

Shrinkage is linear shrinkage ($\Delta L/L_o(\%)$), and it is the difference in length between the unsintered body, i.e. compact, and the sintered body, $\Delta L$, divided by the length of the compact, $L_o$. This shrinkage is an indication of the extent of densification.

Densities were obtained on the as-fired sintered bodies.

Phase composition of the sintered specimens was determined by standard metallographic techniques using optical microscopy.

Forward diffuse transmission measurements on optically translucent bodies were made using a Perkin Elmer model 330 spectrophotometer using an integrating sphere of 60 mm diameter. The body was placed reproduceably in the same position each time by butting the body against the aperture. Forward diffuse transmittance herein was determined with a cone angle of the transmitted beam from 120° to 180°.

Forward specular transmission measurements on sintered bodies were also made on the Perkin Elmer 330 spectrophotometer by using a ⅜" aperture and positioning the body in the center of the sample compartment. Forward specular transmittance herein was determined with cone angle around the transmitted beam less than 2°.

EXAMPLE 1

At room temperature aluminum secondary butoxide was admixed with ethylsilicate to form solution of desired $Al_2O_3/SiO_2$ ratio, and a number of solutions of varied ratio, i.e. 73 wt %–77 wt % $Al_2O_3$/balance $SiO_2$ were thus formed.

Each 600 gram solution was diluted with 1 liter of cyclohexane. A mixture composed of equivalent amounts of water and tertiary butyl alcohol was admixed with each solution in an amount which was calculated to provide sufficient water to completely hydrolyze it forming a dispersion of an insoluble polymeric precipitate of the $Al_2O_3/SiO_2$ ratio.

Each resulting dispersion was stirred overnight at room temperature to insure complete homogeneity and then the precipitate, i.e. gel, was filtered off. The gel was washed three times with cyclohexane to remove its alcohol content. The resulting gel was freeze-dried producing a fluffy free-flowing shapeless powder. This procedure was repeated a number of times producing a number of batches of powder.

The powders were calcined in air at temperatures ranging from 490° C.–1100° C. for firing time periods ranging from 8 hours to 20 hours to remove its water and hydrocarbon content so that no significant amount thereof remained.

The calcined powder was fluffy, free-flowing, shapeless and amorphous to X-ray diffraction analysis. The noncalcined powder, as well as the calcined powder, had a specific surface area ranging from 100 $m^2/g$ to 400 $m^2/g$, and typically 400 $m^2/g$, and it had a bulk density ranging from about 0.2 g/cc to about 0.3 g/cc.

The calcined powder was pressable in a steel die at room temperature under a pressure of about 50,000 psi into a compact having a minimum density of 1.0 g/cc.

EXAMPLE 2

Aluminum monohydrate with an average particle size of 200 Å was dispersed in water to form a colloidal dispersion. Specifically, the concentration was 1 gram of AlO (OH):8 grams of $H_2O$. The dispersion was effected by adding $HNO_3$ to obtain a pH of 3 to 4. The AlO(OH) dispersion was ball milled overnight and removed from the mill. On standing 24 hours or more a small fraction of the AlO(OH) settled from the dispersion and was removed by straining the clear solution.

The AlO(OH) dispersion was analyzed gravimetrically to determine the concentration of $Al_2O_3$ exactly. Ethyl silicate $(Si(OC_2H_5)_4)$ was then added to produce a mixture of the desired $Al_2O_3/SiO_2$ ratio, and a number of mixtures of varying ratio, i.e. 69.9 wt %–79.1 wt % $Al_2O_3$/balance $SiO_2$ were thus formed.

Each mixture was vigorously stirred at room temperature for several hours until the ethyl silicate was completely hydrolyzed, and after that each mixture was placed in a high speed mixer and ammonia was added until the dispersion gelled. Typically 3 cc to 6 cc of $NH_4(OH)$ were required for each liter of dispersion.

Each resulting gel was frozen and subsequently thawed at room temperature which turned the gel into a filterable dispersion.

The gel particles were filtered off from the solution and washed with anhydrous methanol and acetone in sequence to remove all $H_2O$ from the particles prior to drying.

The resulting non-aqueous gel was dried at 200° C. in air producing the present white fluffy flowable starting powder. Usually, this powder was screened thru a 40 mesh sieve to break down or remove any aggregates.

This procedure was repeated a number of times producing a number of batches of powder.

The starting powders were calcined, i.e. fired, in air at temperatures ranging from 490° C.–1100° C. for firing time periods necessary to remove their water and hydrocarbon content so that no significant amount thereof remained.

The calcined powder was fluffy, free-flowing, shapeless and amorphous to X-ray diffraction analysis. The non-calcined powder, as well as the calcined powder, had a specific surface area ranging from 100 $m^2/g$ to 400 $m^2/g$, typically 400 $m^2/g$, and a bulky density ranging from about 0.2 g/cc to about 0.3 g/cc.

The calcined powder was pressable in a steel die at room temperature under a pressure of about 50,000 psi into a compact having a minimum density of 1.0 g/cc.

EXAMPLE 3

An aluminosilicate powder comprised of 75 wt % $Al_2O_3$/balance $SiO_2$ was prepared in the same manner as disclosed in Example 1. The powder was calcined at 600° C. in air for about 8 hours. A portion of the calcined powder was analyzed by wet chemical analysis and found to be composed of 75% by weight $Al_2O_3$ and 25% by weight $SiO_2$. Impurities determined by emission spectroscopy of the calcined powder were in %, 0.2 Na, 0.01 Fe, <0.004 Ca, 0.07 Ti.

The calcined powder was placed within a rubber membrane and isostatically pressed in an oil bath at room temperature under a pressure of 125,000 psi into a billet ⅜" in diameter which weighed 14.5 grams. The billet had a green density of 1.6 grams/cc.

The billet was sintered in flowing oxygen at atmospheric pressure at 1650° C.–1675° C. for 1.5 hours and then furnace-cooled to room temperature. The resulting closed pore billet was gas-impermeable.

The gas impermeable cylindrical billet was hot isostatically pressed with Argon under 30,000 psi at 1650° C. for 1.5 hours, and then as it was furnace-cooled to room temperature the pressure was reduced to atmospheric.

The resulting theoretically dense body was white opaque and had a density of 3.16 g/cc. A thin cross-section of the billet was polished to a thickness of 1 to 2 mils and examined microscopically using transmitted light. A secondary $Al_2O_3$ phase was observed. The capacity of the body was attributed to light scattering due to the secondary $Al_2O_3$ phase.

A portion of the billet was sliced cross-sectionally into four discs, each disc was about 30 mils in thickness. Each disc was annealed in flowing oxygen at atmospheric pressure. One disc was annealed for 6 hours at 1800° C. The other discs were annealed for one hour, i.e. one was annealed at 1750° C., one at 1800° C. and one at 1850° C. All of the discs were furnace cooled to room temperature.

Each annealed disc was approximately 30 mils thick. Each annealed disc was optically translucent, and each in its as-annealed, non-polished condition would be useful as an enclosure for an arc tube. When each annealed disc was laid against newspaper print, the print could be read by eye.

During annealing, the second $Al_2O_3$ phase was absorbed into mullite phase and produced an optically translucent body. The optical translucency of these discs indicated that they were theoretically dense. However, the optical translucency of the disc annealed at 1750° C. was not as high as that of the discs annealed at 1800° C. or at 1850° C. Examination of portions of all of the annealed discs by X-ray diffraction analysis and by optical microscopy showed that the discs annealed at 1800° C. and at 1850° C. were composed of single phase mullite whereas the disc annealed at 1750° C. was composed of single phase mullite but also showed a small amount of $Al_2O_3$ phase, i.e. the amount of $Al_2O_3$ phase was less than 1% by volume of the disc.

The optically translucent disc annealed at 1800° C. for 6 hours was ground and polished on both sides to a thickness of 0.030" (0.76 mm). An optical transmittance scan of the visible region of the electromagnetic spectrum of this polished disc was made and is shown in FIG. 3. Specifically, FIG. 3 shows a forward diffuse transmittance ranging from about 67% to about 74% in the visible spectrum ranging from 4000 Angstroms to 8000 Angstroms. FIG. 3 also shows the forward specular transmittance of this polished disc to range from about 6% to 8%.

As a control, FIG. 3 also shows the forward diffuse transmittance obtained with sapphire of 0.76 mm thickness.

The discs that had been annealed for one hour at 1800° C. and at 1850° C. were polished and these discs along with the polished disc annealed at 1800° C. for 6 hours were etched in boiling concentrated sodium hydroxide, washed with water and dried to reveal their grain boundaries.

The microstructure of the etched disc annealed at 1800° C. for 6 hours is shown in FIG. 1. FIG. 1 shows that it had a substantially uniform microstructure comprised of substantially regular equiaxed grains which had an average grain size of 15 microns as determined by mean linear intercept.

The etched discs that had been annealed for one hour at 1800° C. and at 1850° C. also had a substantially uniform microstructure composed of regular or substantially regular equiaxed grains, and as measured by mean linear intercept, the disc annealed at 1800° C. had an average grain size of 14 microns whereas the disc annealed at 1850° C. had an average grain size of 19 microns.

EXAMPLE 4

An aluminosilicate powder comprised of 74 weight % $Al_2O_3$/26 weight % $SiO_2$ was prepared in the same manner as disclosed in Example 2. The powder was calcined at 600° C. in air for about 8 hours.

The calcined powder was pressed at room temperature in a steel die under a pressure of 100,000 psi into a disc, one-half inch in diameter and about 30 mils thick. The disc had a density of about 1.35 g/cc.

The disc was sintered in oxygen at atmospheric pressure for 3 hours at 1675° C. producing a gas impermeable disc and then it was furnace cooled to room temperature.

The resulting gas impermeable disc was hot isostatically pressed with argon under 30,000 psi at 1675° C. for 3 hours, and then as it was furnace cooled to room temperature, the pressure was reduced to atmospheric. The resulting disc has undergone a shrinkage of 23%, and specifically, it was about 23 mils thick.

The resulting disc was optically translucent. Its optical translucency indicated that it was theoretically dense and composed of single phase mullite. The disc in its non-polished condition would be useful as an enclosure for an arc tube. When it was laid against newspaper print, the print could be read by eye.

The optically translucent disc was annealed in oxygen at 1820° C. for 3 hours and then furnace cooled to room temperature. The optical translucency of this disc did not appear to the eye to have changed significantly. The annealed disc was polished, etched in boiling concentrated sodium hydroxide, washed with water and dried to reveal its grain boundaries and its microstructure is shown in FIG. 2.

Figure 2:
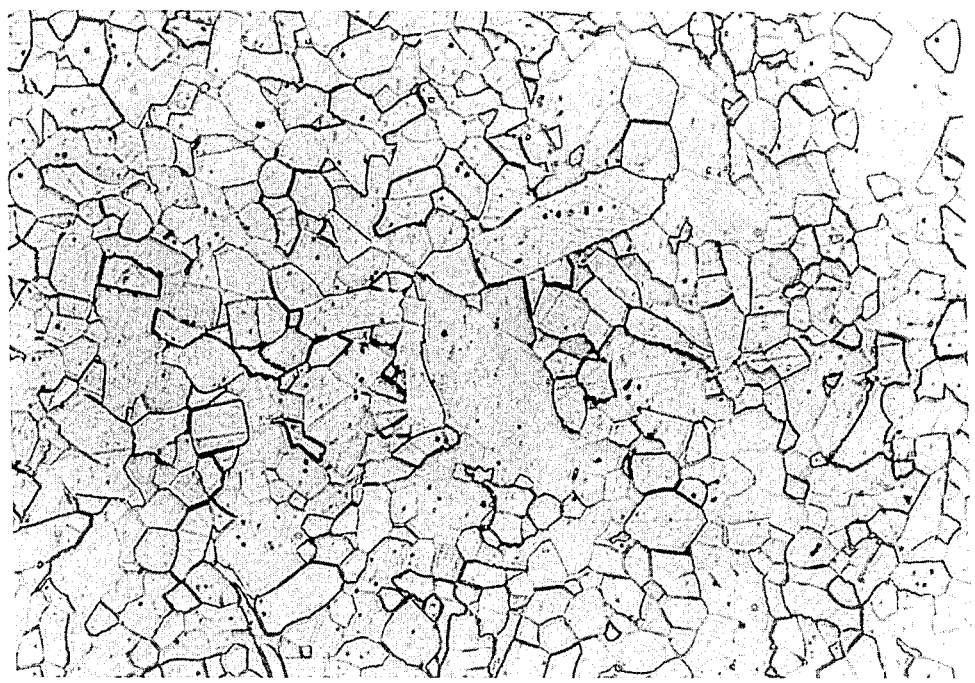
FIG. 2 is a photomicrograph (magnified 750×) showing a polished and etched section of a sintered optically translucent disc of 74 weight % $Al_2O_3$/26 weight % $SiO_2$ produced in accordance with the present invention.

FIG. 2 shows a microstructure composed of a mixture of elongated grains and equiaxed grains and illustrates the microstructure obtained when a body composed of 74 weight % $Al_2O_3$/26 weight % $SiO_2$ is subjected to a temperature of 1820° C.

As used herein, transmission and transmittance are equivalent.

The following copending U.S. patent applications are assigned to the assignee hereof and are incorporated herein by reference and contain claims to the same product herein or cover the product herein:

Ser. No. 381,821 filed of even date herewith in the names of S. Prochazka and F. J. Klug entitled, "OPTICALLY TRANSLUCENT MULLITE CERAMIC" discloses pressing amorphous mixed oxide powder composed of from about 74 weight % to about 76.5 weight % $Al_2O_3$/balance $SiO_2$ into a compact with a density of at least 1 g/cc, and sintering the compact in oxygen producing an optically translucent theoretically dense body of mullite.

Ser. No. 381,820 filed of even date herewith in the names of S. Prochazka and F. J. Klug entitled, "OPTICALLY TRANSLUCENT CERAMIC" discloses pressing amorphous mixed oxide powder composed of from about 74 weight % to about 76.5 weight % $Al_2O_3$/balance $SiO_2$ into a compact with a density of at least 1 g/cc, firing the pressed compact in oxygen or a vacuum of 0.05 torr to 1 torr to produce a compact impermeable to gas, and sintering the resulting fired body in air, argon, helium, nitrogen, or mixtures thereof producing an optically translucent theoretically dense body of mullite.

What is claimed is:

1. A process for producing a mullite body optically translucent in the visible wave length which comprises providing an amorphous shapeless mixed oxide powder consisting essentially of from about 72.5 weight % to about 74 weight % $Al_2O_3$ balance $SiO_2$ with a surface area ranging from about 100 square meters per gram to about 400 square meters per gram and a bulk density ranging from about 0.2 g/cc to about 0.3 g/cc containing a significant amount of water, calcining said powder at a temperature ranging from about 490° C. to about 1100° C. to remove water and any organic material therefrom leaving no significant amount thereof producing an amorphous shapeless mixed oxide powder consisting essentially of from about 72.5 weight % to about 74 weight % $Al_2O_3$ balance $SiO_2$, said calcining having no significant effect on the oxide composition or morphology of said powder, said calcined powder being pressable at about room temperature into a compact having a minimum density of 1.0 g/cc, pressing said calcined powder into a compact having a minimum density of 1.0 g/cc, sintering said compact at a temperature which has no significant deleterious effect on it ranging from about 1500° C. to about 1675° C. in oxygen or in a vacuum ranging from about 0.05 torr to about 1 torr producing a gas-impermeable compact, and hot isostatically pressing said gas-impermeable compact with a gas which has no significant deleterious effect on it at superatmospheric pressure of at least about 5000 psi at a temperature ranging from about 1500° C. to about 1700° C. producing a body of theoretical density based on the density of 3.16 g/cc±0.01 or 3.17 g/cc±0.01 for said mullite body, said gas being selected from the group consisting of argon, helium, nitrogen and mixtures thereof.

2. A process for producing a mullite body optically translucent in the visible wave length which comprises providing an amorphous shapeless mixed oxide powder consisting essentially of from about 72.5 weight % to about 74 weight % $Al_2O_3$ balance $SiO_2$ with a surface area ranging from about 200 square meters per gram to about 300 square meters per gram and a bulk density ranging from about 0.2 g/cc to about 0.3 g/cc containing a significant amount of water, calcining said powder at a temperature ranging from about 500° C. to 700° C. to remove water and any organic material therefrom producing an amorphous shapeless mixed oxide powder consisting essentially of from about 72.5 weight % to about 74 weight % $Al_2O_3$ balance $SiO_2$, said calcining having no significant effect on the oxide composition or morphology of said powder, said calcined powder being pressable at about room temperature into a compact having a minimum density of 1.0 g/cc, pressing said calcined powder into a compact having a minimum density of 1.0 g/cc, sintering the compact at a temperature which has no significant deleterious effect on it at a temperature ranging from about 1600° C. to about 1650° C. in oxygen or in a vacuum from about 0.05 torr to about 1 torr producing a gas-impermeable compact, hot isostatically pressing the gas-impermeable compact with a gas which has no significant deleterious effect on it at superatmospheric pressure of at least about 5000 psi at a temperature ranging from about 1600° C. to about 1700° C. producing a body of theoretical density based on the density of 3.16 g/cc±0.01 or 3.17 g/cc±0.01 for said mullite body, said gas being selected from the group consisting of argon, helium, nitrogen and mixtures thereof.

3. A process for producing a mullite body optically translucent in the visible wave length which comprises providing an amorphous shapeless mixed oxide powder consisting essentially of from about 72.5 weight % to about 76.5 weight % $Al_2O_3$ balance $SiO_2$ with a surface area ranging from about 100 square meters per gram to about 400 square meters per gram and a bulk density ranging from about 0.2 g/cc to about 0.3 g/cc containing a significant amount of water, calcining said powder at a temperature ranging from about 490° C. to about 1100° C. to remove water and any organic material therefrom leaving no significant amount thereof producing an amorphous shapeless mixed oxide powder consisting essentially of from about 72.5 weight % to about 76.5 weight % $Al_2O_3$ balance $SiO_2$, said calcining having no significant effect on the oxide composition or morphology of said powder, said calcined powder being pressable at about room temperature into a compact having a minimum density of 0.1 g/cc, pressing said calcined powder into a compact having a minimum density of 1.0 g/cc, sintering the compact at a temperature which has no significant deleterious effect on it at a temperature ranging from about 1500° C. to about 1675° C. in oxygen or in a vacuum ranging from about 0.05 torr to about 1 torr producing a gas-impermeable compact, hot isostatically pressing the gas-impermeable compact with a gas which has no significant deleterious effect on it at superatmospheric pressure of at least about 5000 psi at a temperature ranging from about 1500° C. to about 1700° C. producing a body of theoretical density based on the density of 3.16 g/cc±0.01 or 3.17 g/cc±0.01 for said mullite body, said isostatic pressing gas being selected from the group consisting of argon, helium, nitrogen and mixtures thereof, and annealing said theoretically dense body in a gas selected from the group consisting of air, oxygen, argon, helium, nitrogen and mixtures thereof at a temperature ranging from about 1700° C. to about 1850° C., said annealing temperature having no significant deleterious effect thereon.

4. A process for producing a mullite body optically translucent in the visible wave length which comprises providing an amorphous shapeless mixed oxide powder consisting essentially of from about 72.5 weight % to about 76.5 weight % $Al_2O_3$ balance $SiO_2$, with a surface area ranging from about 200 square meters per gram to about 300 square meters per gram and a bulk density ranging from about 0.2 g/cc to about 0.3 g/cc containing a significant amount of water, calcining said powder at a temperature ranging from about 500° C. to 700° C. to remove water and any organic material therefrom producing an amorphous shapeless mixed oxide powder consisting essentially of from about 72.5 weight % to about 76.5 weight % $Al_2O_3$ balance $SiO_2$, said calcining having no significant effect on the oxide composition or morphology of said powder, said calcined powder being pressable at about room temperature into a compact having a minimum density of 1.0 g/cc, pressing said calcined powder into a compact having a minimum density of 1.0 g/cc, sintering said compact at a temperature which has no significant deleterious effect on it ranging from about 1600° C. to about 1650° C. in oxygen or in a vacuum ranging from about 0.05 torr to about 1 torr producing a gas-impermeable compact, hot isostatically pressing said gas-impermeable compact with a gas which has no significant deleterious effect on it at superatmospheric pressure of at least about 5000 psi at a temperature ranging from about 1600° C. to about 1700° C. producing a body of theoretical density based on the density of 3.16 g/cc±0.01 or 3.17 g/cc±0.01 for said mullite body, said isostatic pressing gas being selected from the group consisting of argon, helium, nitrogen and mixtures thereof, and annealing said theoretically dense body in a gas selected from the group consisting of oxygen, air, argon, helium, nitrogen and mixtures thereof at a temperature ranging from about 1700° C. to about 1850° C., said annealing temperature having no significantly deleterious effect thereon.

5. A polycrystalline mullite body optically translucent in the visible wave length consisting essentially of from about 72.5 weight % to about 76.5 weight % $Al_2O_3$ balance $SiO_2$, said body being of theoretical density based on a density of 3.16 gram/cc±0.01 or 3.17 gram/cc±0.01 for said mullite body, said body ranging from a single phase of mullite to one composed of a primary phase of mullite and a secondary phase ranging up to but less than 1% by volume of the total volume of said body, and said body having an average minimum forward diffuse transmittance of 70% at 0.75 millimeter of thickness over the wave lengths ranging from 4000 Angstroms to 8000 Angstroms.

6. The optically translucent body of claim 5 wherein said secondary phase is $Al_2O_3$.

7. The optically translucent body of claim 5 wherein said secondary phase is glass.

8. A polycrystalline mullite body optically translucent in the visible wave length consisting essentially of from about 74 weight % to about 76.5 weight % $Al_2O_3$ balance $SiO_2$, said body having a microstructure comprised of equiaxed or substantially equiaxed grains, said body being of theoretical density based on a density of 3.16 gram/cc±0.01 or 3.17 gram/cc±0.01 for said mullite body, said body ranging from a single phase of mullite to one composed of a primary phase of mullite and a secondary phase ranging up to but less than 1% by volume of the total volume of said body, and said body having an average minimum forward diffuse transmittance of 70% at 0.75 millimeter of thickness over the wave lengths ranging from 4000 Angstroms to 8000 Angstroms.

9. The optically translucent body of claim 8 wherein said secondary phase is $Al_2O_3$.

10. The optically translucent body of claim 8 wherein said secondary phase is glass.

11. A polycrystalline mullite body optically translucent in the visible wave length consisting essentially of from about 72.5 weight % up to about 74.5 weight % $Al_2O_3$ balance $SiO_2$, said body having a microstructure ranging from one composed of elongated grains to one composed of equiaxed grains and all combinations thereof, said body being of theoretical density based on a density of 3.16 grams/cc±0.01 or 3.17 grams/cc±0.01 for said mullite body, said body ranging from a single phase of mullite to one composed of a primary phase of mullite and a secondary phase ranging up to but less than 1% by volume of the total volume of said body, and said body having an average minimum forward diffuse transmittance of 70% at 0.75 millimeter of thickness over the wave lengths ranging from 4000 Angstroms to 8000 Angstroms.

12. The optically translucent body of claim 11 wherein said secondary phase is glass.

13. A polycrystalline mullite body optically translucent in the visible wave length consisting essentially of from about 74.5 weight % to about 75.5 weight % $Al_2O_3$ balance $SiO_2$, said body having a substantially uniform microstructure comprised of equiaxed or substantially equiaxed grains, said body being of theoretical density based on a density of 3.16 gram/cc±0.01 or 3.17 gram/cc±0.01 for said mullite body, said body being composed of a single phase of mullite, and said body having an average minimum forward diffuse transmittance of 70% at 0.75 millimeter of thickness over the wave lengths ranging from 4000 Angstroms to 8000 Angstroms.

14. The process according to claim 1 wherein said compact is of hollow and/or geometrically complex shape.

15. The process according to claim 3 wherein said compact is of hollow and/or geometrically complex shape.

16. The body of claim 5 being of hollow and/or geometrically complex shape.

17. The body of claim 8 being of hollow and/or geometrically complex shape.

18. The body of claim 11 being of hollow and/or geometrically complex shape.

19. The body of claim 13 being of hollow and/or geometrically complex shape.

* * * * *